United States Patent [19]  [11] 4,025,496
Anderson et al.  [45] May 24, 1977

[54] SEQUENCED ADDITION OF COMPONENTS IN POLY(ARYLENE SULFIDE) PRODUCTION

[75] Inventors: Kenneth L. Anderson, Bartlesville, Okla.; Donald G. Kuper, Borger, Tex.

[73] Assignee: Phillips Petroleum Company, Bartlesville, Okla.

[22] Filed: Oct. 10, 1975

[21] Appl. No.: 621,448

[52] U.S. Cl. .................................. 260/79.1; 260/79
[51] Int. Cl.² ........................................ C08G 75/16
[58] Field of Search ............................ 260/79, 79.1

[56]  References Cited
UNITED STATES PATENTS

| 3,354,129 | 11/1967 | Edmonds, Jr. et al. | 260/79 |
| 3,786,035 | 1/1974 | Scoggin | 260/79.1 |
| 3,919,177 | 11/1975 | Campbell | 260/79.1 |

*Primary Examiner*—Melvyn I. Marquis

[57]  ABSTRACT

A method is provided for producing a reaction mixture comprising arylene sulfide polymer that can be subjected to distillation and extraction with water and readily filtered to recover the arylene sulfide polymer. The method entails preparing a composition of at least one alkali metal bisulfide and at least one organic amide, then admixing at least one alkali metal hydroxide into this composition and introducing p-dihalobenzene into the mixture thus produced, then subjecting the mixture to polymerization conditions for a time sufficient to form an arylene sulfide polymer.

13 Claims, No Drawings

SEQUENCED ADDITION OF COMPONENTS IN POLY(ARYLENE SULFIDE) PRODUCTION

BACKGROUND OF THE INVENTION

This invention relates to the production of arylene sulfide polymer. In one of its aspects this invention relates to the production of p-phenylene sulfide polymer. In another of its aspects this invention relates to the sequence of addition of components to the reaction mixture in the production of arylene sulfide polymer. In yet another of its aspects this invention relates to the production of readily filterable arylene sulfide polymer.

In the production of an arylene sulfide polymer by employing a p-dihalobenzene; an alkali metal sulfide, which is readily prepared by reaction of an alkali metal bisulfide with an alkali metal hydroxide; and an organic amide, recovery and purification of the polymer normally entails several washings of the polymer with water and filtration of the resultant slurries to remove the alkali metal halide formed as a by-product. These filtrations are more time consuming than desired because the filter cake and filter provide considerable resistance to flow of the liquid passing through. A process whereby the filtration time can be reduced is very desirable.

It is therefore an object of this invention to produce a reaction mixture comprising arylene sulfide polymer that can be subjected to distillation and extraction with water to produce arylene sulfide polymer solids recoverable by filtration. It is another object of this invention to provide a sequenced addition of components to a reaction mixture in the production of arylene sulfide polymer. It is still another object of this invention to provide a method entailing the sequenced addition of components to produce a reaction mixture that can be readily filtered to recover arylene sulfide polymer.

Other aspects, objects, and the various advantages of this invention will become apparent upon reading the specifications and the appended claims.

STATEMENT OF THE INVENTION

In accordance with this invention a first composition comprising at least one alkali metal bisulfide in hydrated form and/or as an aqueous mixture and at least one organic amide is admixed with at least one alkali metal hydroxide to give a second composition, at least a portion of which is reacted with at least one p-dihalobenzene under polymerization conditions for a period of time sufficient to form a reaction mixture containing arylene sulfide polymer from which the volatile substances are then removed by distillation. Metal salt is then separated from the distillation solids by dissolution of the salt in water and filtration of the insoluble arylene sulfide polymer from the solution. Optionally, but preferably, said second composition comprises at least one alkali metal salt selected from the group consisting of alkali metal carboxyltes and lithium halides, the alkali metal salt being added during or after the preparation of said first composition to provide an arylene sulfide polymer of lower melt flow. If desired, a minor amount of a polyhalo aromatic compound having more than two halogen substituents per molecule can be charged to the polymerization reactor at substantially the same time as the p-dihalobenzene, or said polyhalo aromatic compound can be added, incrementally or all at once, to the polymerization reactor during the course of the polymerization, after polymerization of the p-dihalobenzene has begun.

p-Dihalobenzenes which can be employed can be employed in the process of this invention can be represented by the formula

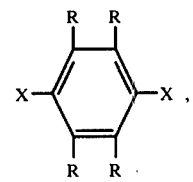

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromoenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexy-3-dodecyl-2,5dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhalo aromatic compounds having more than two halogen substituents per molecule which can be employed in the process of this invention can be represented by the formula $R'X_n$, where each X is selected from the group consisting of chlorine, bromine, and iodine, $n$ is an integer of 3 to 6, an R' is a polyvalent aromatic radical of valence $n$ which can have up to about four methyl substituents, the total number of carbon atoms in R' being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,2,4-triiodobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2', 6,6'-tetrabromo-3,3', 5,5'-tetramethylbiphenyl, 1,2, 3,4-tetrachloronaphthalene, 1,2,5,6-tetraiodonaphthalene, 1,2,4-tribromo-6-methylnaphthalene, and the like, and mixtures thereof.

Alkali metal bisulfides which can be employed in the process of this invention include lithium bisulfide, sodium bisulfide, potassium bisulfide, rubidium bisulfide, cesium bisulfide, and mixtures thereof. As stated above, the alkali metal bisulfide should be employed in hydrated form and/or as an aqueous mixture, preferably in the liquid state at the temperature of use. Although the water present with the alkali metal bisulfide can vary over a considerable range, generally the water will be present, as water of hydration and/or as free water, in an amount within the range of about 20 to about 60 weight percent, preferably about 25 to about 40 weight percent, based on the total weight of alkali metal bisulfide plus water associated therewith.

Alkali metal hydroxides which can be employed in the process of this invention include lithium hydroxide, sodium hydroxide, potassium hydroxide, rubidium hydroxide, cesium hydroxide, and mixtures thereof. Although the alkali metal hydroxide can be employed in anhydrous form preferably is employed in hydrated form and/or as an aqueous mixture, more preferably in the liquid state at the temperature of use. Although the water present with the alkali metal hydroxide can vary over a considerable range, generally the water will be present, as water of hydration and/or as free water, in an amount up to about 70 weight percent, preferably about 25 to about 60 weight percent, based on the total weight of alkali metal hydroxide plus water associated therewidth.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrolidone, N-methy-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Alkali metal carboxylates which can be employed in the process of this invention can be represented by the formula R''CO$_2$M, where R'' is a hydrocarbyl radical selected from alkyl, cycloalkyl, and aryl, and combinations thereof such as alkaryl, aralkyl, and the like, the number of carbon atoms in said R'' being within the range of 1 to about 20, and M is an alkali metal selected from lithium, sodium, potassium, rubidium, and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyl- tetradecanoate, sodium octanoate, sodium heneicosanoate, lithium cyclohexane- carboxylate, cesium cyclododecanecarboxylate, sodium 3-methylcyclopentane-carboxylate, potassium cyclohexylacetate, potassium benzoate, lithium benzoate, sodium benzoate, potassium m-toluate, lithium phenylacetate, sodium 4-phenyl- cyclohexanecarboxylate, potassium p-tolylacetate, lithium 4-ethylcyclohexyl-acetate, and the like, and mixtures thereof.

Lithium halides which can be employed in the process of this invention include lithium chloride, lithium bromide, lithium iodide, and mixtures thereof. If desired, the lithium halide can be employed as a hydrate or as a solution or dispersion in water.

Although the mole ratio of p-dihalobenzene to alkali metal bisulfide can vary over a considerable range, generally it will be within the range of about 0.9:1 to about 1.2:1, preferably about 1:1 to about 1.05:1. When a polyhalo aromatic compound having more than two halogen substituents per molecule is employed, generally it will be used in an amount up to about 0.6 part by weight per 100 parts by weight p-dihalobenzene, preferably about 0.1 to about 0.4 part by weight per 100 parts by weight p-dihalobenzene. The mole ratio of alkali metal hydroxide to alkali metal bisulfide can vary over a considerable range, but generally will be within the range of about 1:1 to about 1.8:1, preferably about 1.01:1 to about 1.6:1 when an alkali metal salt selected from alkali metal carboxylates and lithium halides is employed and preferably about 1:1 to about 1.1:1 when said alkali metal salt is not employed. The amount of organic amide can vary greatly, generally being within the range of about 100 kilograms to about 2500 kilograms, preferably about 200 kilograms to about 1000 kilograms, per kilogram-mole of alkali metal bisulfide. When an alkali metal salt selected from alkali metal carboxylates and lithium halides is employed, generally it will be used in an amount up to about 4 moles per mole of alkali metal bisulfide, preferably being used in an amount within the range of about 0.1 mole to about 2 moles per mole of alkali metal bisulfide.

Although the reaction temperature at which the polymerization is conducted can vary over a wide range, generally it will be within the range of about 150° C to about 400° C, preferably about 200° C to about 300° The reaction time can vary widely, depending in part on the reaction temperature, but generally will be within the range of about 10 minutes to about 72 hours, preferably about 1 hour to about 8 hours. The pressure should be sufficient to maintain the p-dihalobenzene, the polyhalo aromatic compound having more than two halogen substituents per molecule, if used, and the organic amide substantially in the liquid phase.

In the production of arylene sulfide polymers by the process of this invention, the alkali metal hydroxide is mixed with the mixture comprising the alkali metal bisulfide and the organic amide. If desired, an alkali metal salt selected from the group consisting of alkali metal carboxylates and lithium halides, as defined above, can be added to provide an arylene sulfide polymer of lower melt flow, said alkali metal salt being added at any time prior to addition of the p-dihalobenzene. If the organic amide and said alkali metal salt are admixed prior to addition of the other ingredients, and if the alkali metal salt is employed as a hydrate or as an aqueous solution or dispersion, at least a portion of the water can be removed by distillation from the mixture of organic amide and alkali metal salt prior to addition of the other ingredients. After addition of the alkali metal hydroxide, it is preferable that water be removed by distillation prior to addition of the p-dihalobenzene. As indicated above, the polyhalo aromatic compound having more than two halogen substituents per molecule, if used, can be added at substantially the same time as the p-dihalobenzene, or it can be added incrementally or all at once during the course of the polymerization, after polymerization of the p-dihalobenzene has begun. If desired, carbon dioxide can be added during the polymerization or upon completion of the polymerization, its use being preferred if the mole ratio of alkali metal hydroxide employed to alkali metal bisulfide employed is greater than 1:1 and if volatile substances are to be distilled from the arylene sulfide polymer and metal salt at elevated temperatures, e.g., above about 200° C, in which instance the carbon dioxide preferably is used in an amount of about 0.5 to about 1 mole per mole of alkali metal hydroxide in excess of the number of moles of alkali metal bisulfide employed. Volatile substances, including the organic amide and any water present, are removed from the arylene sulfide polymer and metal salt by distillation. If desired, reduced pressure can be used to aid in the distillation. The mixture of arylene sulfide polymer and metal salt is then washed with sufficient water to extract most of the metal salt, and the resulting mixture is filtered. The washing and filtration steps are preferably repeated one to about four times. Although the temperature used in the washing and filtration steps is not critical, and these steps can be carried out at ambient temperature, e.g., about 25° C, it is preferable that at least one of the washing steps be conducted at an elevated temperature, e.g., about 150° C to about 200° C, to provide good extraction of metal salt. The washing and filtration can be conducted batchwise or continuously. Although the filtration can be carried out under applied pressure or at atmospheric pressure, vacuum filtration is preferred.

The arylene sulfide polymers produced by the process of this invention can be blended with fillers, pigments, extenders, other polymers, and the like. They can be cured through crosslinking and/or chain extensions, e.g., by heating at temperatures up to about 480° C in the presence of a free oxygen-containing gas, to provide cured products having high thermal stability and good chemical resistance. They are useful in the production of coatings, films, molded objects, and fibers.

EXAMPLES

In the following examples, filtrations of polymer were conducted through use of a 5-square foot Bird-Young rotary drum filter fitted with a 63° nylon twill filter cloth (National Filter Media, Cloth No. 150-029-04), using 13–18 inches (33–46 centimeters) Hg vacuum. Values for melt flow were determined by the method of ASTM D 1238-70, modified to a temperature of 600° F (316° C) using a 5-kg weight, the value being expressed as g/10 min. Values for ash content were determined by burning a sample in a crucible over an open flame, followed by further heating of the sample in a furnace at 100° F (538° C) for 4 hours.

EXAMPLE I

Poly (p-phenylene sulfide) was produced in a control run outside the scope of this invention, the sodium sulfide being prepared by reaction of sodium hydroxide with sodium bisulfide in the absence of N-methyl-2-pyrrolidone.

To a stirred 95-gallon (360-liter) reactor were charged 25.0 gallons (96.8 kg) N-methyl-2-pyrrolidone and 85.0 lb. (38.6 kg, 0.38 kg-mole) of lithium acetate dihydrate. The resulting mixture was then dehydrated by distilling water overhead until the reactor temperature reached 395° F (202° C ), yielding 30 lb. (13.6 kg) of distillate containing 29 lb (13.1 kg) water and 1 lb (0.5 kg) N-methyl-2-pyrrolidone. The reactor was then cooled to 250° F (121° C). To the residual mixture was added an aqueous solution prepared by mixing 74.3 lb (33.7 kg) of an aqueous solution of sodium hydroxide (51.3 weight percent, 38.1 lb, 17,3 kg, 0.43 kg-mole NaOH) with 66.9 lb (30.3 kg) of an aqueous solution of sodium bisulfide (68.8 weight percent, 46.0 lb, 20.9 kg, 0.37 kg-mole NaSH; also present, 1.25 weight percent Na$_2$ S). To the reactor was then added 13.5 gallons (52.2 kg) of N-methyl-2-pyrrolidone. The resulting mixture was dehydrated again as described above, yielding 56.5 lb (25.6 kg) of distillate containing 53.3 lb (24.2 kg) of water and 3.2 lb (1.4 kg) of N-methyl-2-pyrrolidone. To the residual mixture was added 123.0 lb (55.8 kg, 0.38 kg-mole) of p-dichlorobenzene. The resulting mixture was heated to 510° F (266° C) and maintained at this temperature for 2 hours at a pressure of 133–137 psig. The reactor pressure was then raised to 200 psig by adding carbon dioxide to the reactor. After 5.7 lb (2.5 kg, 0.06 kg-mole) of carbon dioxide had been added to the reactor, the reactor contents were held at 510° F (266° C) for 45 minutes, during which time the pressure dropped to 160 psig. The reaction mixture was concentrated by removing 152 lb (68.9 kg) of distillate containing 17.7 lb (8.0 kg) of water, 131.3 lb (59.6 kg) of N-methyl-2-pyrrolidone, and 3.0 lb (1.3 kg) of p-dichlorobenzene. The reactor was at 473° F (245° C) and 21 psig after concentrating and was quickly pressured to 150 psig, using steam. The reactor contents were then heated to 540° F (282° C) and pressured again to 150 psig, using nitrogen. The mixture was then dumped from the reactor through a restrictive, control valve at a rate such that the receiving chamber (blender) was maintained at 0.5-1.0 psig pressure. Volatilization of most of the contained water and N-methyl-2-pyrrolidone accompanied this pressure let-down, with residual amounts removed by further volatilization over a 2-hour hold period at 450° F (232° C). The resulting solid material, in granular form, comprising poly(p-phenylene sulfide) and metal salts, was cooled to ambient temperature and transferred to a vessel containing 120° gallons (1000 lb, 454 kg) of water. The material was maintained as a slurry by agitation for 1 hour and then filtered to recover the polymer. This filtration required 255 minutes. For further purification, a slurry of the polymer in water was again prepared, and the slurry was agitated and heated to 350° F (177° C), with continued agitation at this temperature for 1 hour. Then the slurry was cooled to 200° F (94° C) and filtered again, the filtration this time requiring 40 minutes. The polymer was washed at 350° F (177° C) again, cooled to 200° F (94° C), and filtered, the filtration this time requiring 25 minutes. The polymer thus obtained was dried to provide 62 lb (28 kg) of poly (p-phenylene sulfide) having a melt flow of 198 and an ash content of 0.66 weight percent.

EXAMPLE II

In this run, poly(p-phenylene sulfide) was produced in accordance with the process of this invention, the sodium bisulfide being mixed with N-methyl-2-pyrrolidone prior to being mixed with sodium hydroxide.

To a stirred 95-gallon (360-liter) reactor were charged 25.0 gallons (96.8 kg) N-methyl-2-pyrrolidone and 85.0 lb (38.6 kg, 0.38 kg-mole) of lithium acetate dihydrate. The resulting mixture was then dehydrated by distilling water overhead until the reactor temperature reached 401° F (205° C), yielding 31 lb (14.1 kg) of distillate containing 30 lb (13.6 kg) water and 1 lb (0.5 kg) N-methyl-2-pyrrolidone. The reactor was then cooled to 250° F (121° C). To the residual mixture was added, with stirring, 67.0 lb (30.4 kg) of an aqueous solution of sodium bisulfide (68.8 weight percent, 46.0 lb, 20.9 kg, 0.37 kg-mole NaSH; also present, 1.25 weight percent Na$_2$ S). To the resulting mixture was then added 74.2 lb (33.7 kg) of an aqueous solution of sodium hydroxide (51.3 weight percent, 38.1 lb, 17.3 kg, 0.43 kg-mole NaOH), followed immediately by 13.5 gallons (52.2 kg) of N-methyl-2-pyrrolidone. The resulting mixture was dehydrated as before, yielding 52.8 lb (23.9 kg) of distillate containing 52.1 lb (23.6 kg) of water and 0.7 lb (0.3 kg) of N-methyl-2-pyrrolidone. To the residual mixture was added 123.0 lb (55.8 kg, 0.38 kg-mole) of p-dichlorobenzene. The resulting mixture was heated to 510° F (266° C) and maintained at this temperature for 2 hours at a pressure of 135–139 psig. The reactor pressure was then raised to 200 psig by adding carbon dioxide to the reactor. After 5.7 lb (2.6 kg, 0.06 kg-mole) of carbon dioxide had been added to the reactor, the reactor contents were held at 510° F (266° C) for 45 minutes, during which time the pressure dropped to 160 psig. The reaction mixture was concentrated by removing 139 lb (63.0 kg) of distillate containing 14.2 lb (6.4 kg) of water, 124.1 lb (56.3 kg) of N-methyl-2-methyl-2-pyrrolidone, and 0.6 lb (0.3 kg) of p-dichlorobenzene. The reactor was at 474° F (245° C) and 17 psig after concentrating and was quickly pressured to 150 psig, using steam. The reactor contents were then heated to 540° F (282° c) and pressured again to 150 psig, using nitrogen. The mixture was then dumped from the reactor through a restrictive, control valve at a rate such that the receiving chamber (blender) was maintained at 0.5–1.0 psig pressure. Volatilization of most of the contained water and N-methyl-2pyrrolidone accompanied this pressure let-down with residual amounts removed by further volatilization over a 2-hour hold period at 450° F (232° C). The resulting solid material, in granular form, comprising poly(p-phenylene sulfide) and metal salts, was cooled to ambient temperature and transferred to a vessel containing 120 gallons (1000 lb, 454 kg) of water. The material was maintained as a slurry by agitation for 1 hour and then filtered to recover the polymer. This filtration required 65 minutes. For further purification, a slurry of the polymer in water was again prepared, and the slurry was agitated and heated to 350° F (177° C), with continued agitation at this temperature for 1 hour. The slurry was then cooled to 200° F (94° C) and filtered again, the filtration this time requiring 25 minutes. The polymer was washed at 350° F (177° C) again, cooled to 200° F (94° C), and filtered, the filtration this time requiring 20 minutes. The polymer thus obtained was dried to provide 62 lb (28 kg)of poly (p-phenylene sulfide) having a melt flow of 200 and an ash content of 0.56 weight percent.

Thus, comparison of Examples I and II shows that each of the three polymer filtrations in Example II required less time than the corresponding polymer filtration in Example I.

We claim:

1. A method for producing arylene sulfide polymer comprising:

a. preparing a first composition comprising at least one alkali metal bisulfide and at least one organic amide;
   b. admixing at least one alkali metal hydroxide with said first composition to form a second composition;
   c. admixing at least one p-dihalobenzene with at least a portion of said second composition to produce a third composition; and
   d. subjecting said third composition to polymerization conditions for a time sufficient to form a reaction mixture comprising arylene sulfide polymer that can be subjected to distillation and extraction with water and readily filtered to recover arylene sulfide polymer.

2. A method of claim 1 wherein at least one compound selected from among alkali metal carboxylates and lithium halides is added before the addition of p-dihalobenzene.

3. A method of claim 1 wherein said alkali metal bisulfide is employed in the form of a hydrate or an aqueous solution and at least a portion of the water in the mixture is removed by distillation after addition of alkali metal hydroxide.

4. A method of claim 2 wherein water is removed by distillation after the addition of alkali metal hydroxide.

5. A method of claim 1 wherein a polyhalo aromatic compound having more than two halogen substituents per molecule is added to the second composition in step (c).

6. A method of claim 1 wherein $CO_2$ is added to the composition during step (d).

7. A method of cliam 1 wherein $CO_2$ is added to the polymerization reaction mixture after the polymerization has been substantially completed.

8. A method of claim 4 wherein organic amide and water are removed from the reaction mixture after the polymerization is substantially complete.

9. A method of claim 8 wherein the removal of organic amide and water is by distillation at reduced pressure.

10. A method of claim 8 wherein the reaction mixture that has had organic amide and water removed by distillation is further treated by washing with water to extract metal salt.

11. A method of claim 10 wherein washed reaction mixture is filtered to recover arylene sulfide polymer.

12. A method of claim 1 wherein poly (p-phenylene sulfide) is produced.

13. A method of claim 1 wherein poly (p-phenylene sulfide) is produced with the addition of lithium acetate prior to adding p-dihalobenzene to the second composition and $CO_2$ is added to the reaction mixture during step (d), the alkali metal bisulfide is sodium bisulfide, the organic amide is N-methyl-2-pyrrolidone, the alkali metal hydroxide is sodium hydroxide, and the p-dihalobenzene is p-dichlorobenzene.

* * * * *

UNITED STATES PATENT AND TRADEMARK OFFICE
CERTIFICATE OF CORRECTION

PATENT NO. : 4,025,496

DATED : May 24, 1977

INVENTOR(S) : Kenneth L. Anderson et al

It is certified that error appears in the above-identified patent and that said Letters Patent are hereby corrected as shown below:

Column 8, line 33, "cliam" should be --- claim --- and line 50, "1" should be --- 11 ---.

Signed and Sealed this

First Day of November 1977

[SEAL]

Attest:

RUTH C. MASON
*Attesting Officer*

LUTRELLE F. PARKER
*Acting Commissioner of Patents and Trademarks*